United States Patent
Carson

[11] 4,046,639
[45] Sept. 6, 1977

[54] POWER GENERATION AND POTABLE WATER RECOVERY FROM SALINOUS WATER

[75] Inventor: Don B. Carson, Mount Prospect, Ill.

[73] Assignee: UOP Inc., Des Plaines, Ill.

[21] Appl. No.: 744,065

[22] Filed: Nov. 22, 1976

[51] Int. Cl.² ............................................. B01D 3/06
[52] U.S. Cl. .................... 203/11; 203/DIG. 20; 203/DIG. 1; 203/80; 203/91; 60/641; 60/648
[58] Field of Search ........ 203/11, DIG. 1, DIG. 20, 203/DIG. 17, 73, 80, 91; 60/641, 648; 202/234, 182; 159/15, 16, 24 A

[56] References Cited
U.S. PATENT DOCUMENTS

| | | | |
|---|---|---|---|
| 1,230,417 | 6/1917 | Lillie | 203/DIG. 20 |
| 3,468,762 | 9/1969 | Klitzsch | 203/DIG. 20 |
| 3,489,652 | 1/1970 | Williamson | 203/DIG. 20 |
| 3,531,939 | 10/1970 | James | 203/DIG. 20 |
| 3,928,145 | 12/1975 | Othmer | 203/11 |
| 4,009,082 | 2/1977 | Smith | 203/DIG. 20 |

*Primary Examiner*—Hiram H. Bernstein
*Attorney, Agent, or Firm*—James R. Hoatson, Jr.; Robert W. Erickson; William H. Page, II

[57] ABSTRACT

A process for simultaneously generating power and recovering potable water from a source of salinous water — e.g. sea water. Salinous water, from a locus which is proximate to the surface thereof and at a relatively high temperature — e.g. about 85° F. — is exposed to radiant solar energy to increase significantly the temperature thereof — e.g. to a level of at least about 135° F. The heated water is introduced into a plurality of flash separation zones, each succeeding one of which is maintained at a lower subatmospheric pressure than the preceding zone, to provide substantially non-salinous vapor phases. The salinous liquid phase is introduced in series through the plurality of flash zones. The vapor phases are passed through separate, individual turbines, or into different stages of a multiple-stage turbine, from the resulting motion of which power is generated. Vapors exiting from the turbines are condensed via indirect heat-exchange with a second salinous water portion, obtained from a second depth substantially below the surface, and at a comparatively lower temperature — e.g. about 70° F. — to recover the liquid potable water. The salinous liquid phase emanating from the last flash zone is used to vaporize, via indirect heat-exchange, a hydrocarbon; this passes through a turbine, and additional power is generated. The exiting hydrocarbons are condensed, via indirect heat-exchange with another portion of said second salinous water, and recirculated to the indirect heat-exchanger.

The second salinous water portion, following the condensation of said exit turbine vapors, and the third salinous liquid phase, following vaporization of the hydrocarbon, are returned to the original source of the salinous water. Preferably, the water returned to the salinous water source has a temperature not more than 15° F. greater than the temperature of the colder, second salinous water portion.

10 Claims, 1 Drawing Figure

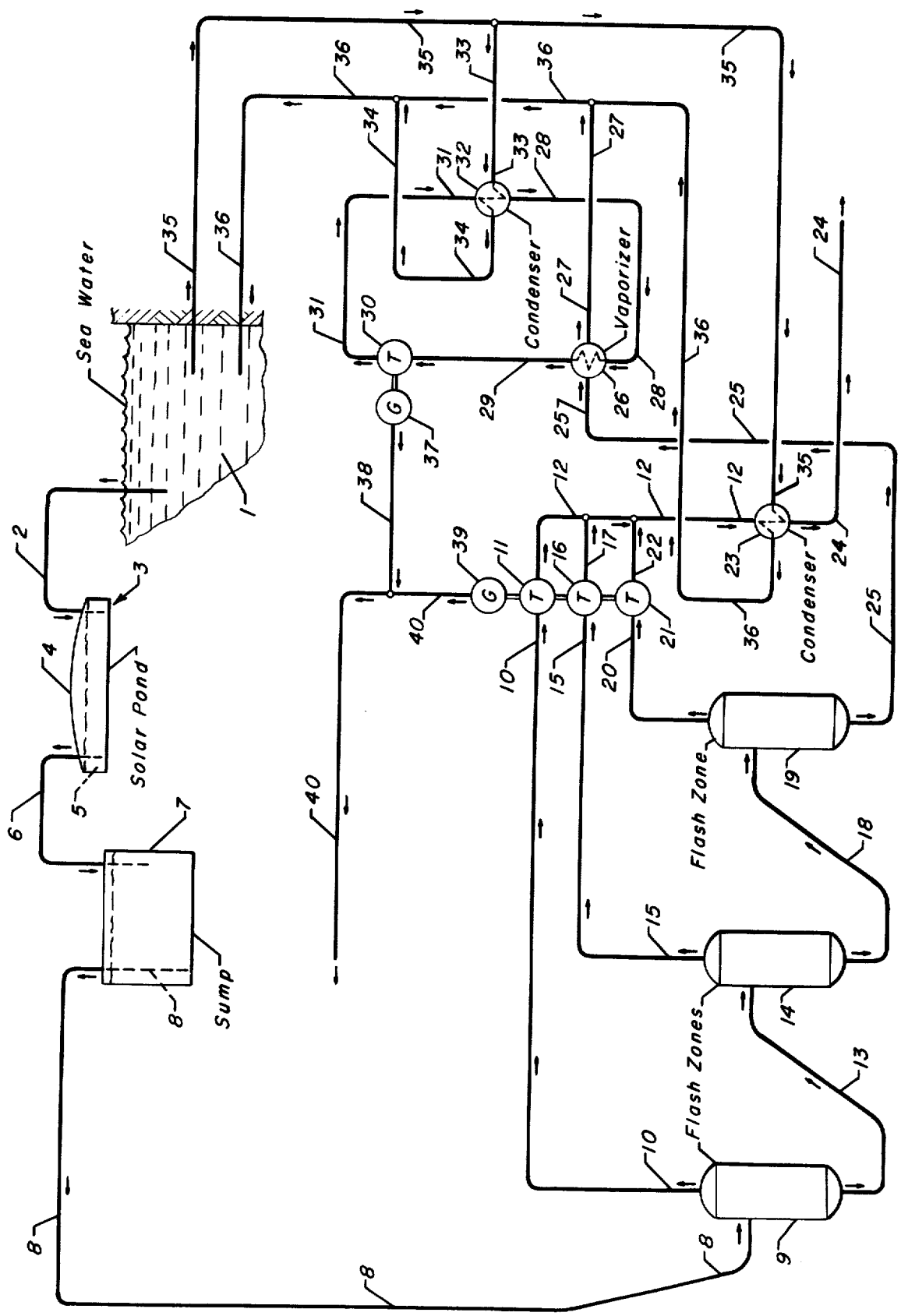

POWER GENERATION AND POTABLE WATER RECOVERY FROM SALINOUS WATER

APPLICABILITY OF INVENTION

The invention herein described is directed toward a technique for simultaneously generating power and recovering potable water from otherwise impotable water. Although applicable to the processing of many types of undrinkable, brackish water and/or water having a high degree of salinity, the inventive concept herein described is intended to be principally directed toward the generation of power and the recovery of potable water from sea water.

According to many knowledgeable scientific researchers, the world is currently entering into a period of time which future historians may well refer to as the "energy-shortage" era. Whether considering (1) the current availability of natural gas, (2) the sufficiency of oil reserves, or (3) heretofore untapped sources of coal, the consensus appears to indicate that a severe energy crisis is, or will soon become an established fact. One consequence is, of course, that a corresponding shortage of electrical power can be foreseen; that is, it no longer will be practical to convert one or more of the foregoing energy sources into electrical power. In order to alleviate this situation, consideration is currently being give to ocean thermal energy conversion. The basic concept, first proposed by a French physicist as early as 1881, involves the operation of a simple heat engine, using warm surface water as a heat source, and colder water, from the depths of the ocean, as the heat sink.

In a similar vein, many areas of the world, especially those which can be characterized as arid, face a critical shortage of potable water, both for human consumption and for irrigation. Although sparsely located throughout many parts of the world, such areas abound particularly in the Middle-Eastern countries and in the Northern desert regions of Africa. Coincidentally, many of these countries, or at least localized sections thereof, either border upon, or are readily accessible to sea and/or ocean waters wherein natural thermal gradients exist. The process encompassed by my inventive concept, although not limited to installation in such areas, is primarily applicable thereto. Exemplary of such a locale is Saudi Arabia, the Western coast of which borders upon the Eastern shore of the Red Sea.

Briefly, the present invention involves the use of a combination of the available ocean thermal energy and the virtually limitless supply of natural solar energy. Initially, a first portion of salinous water from a locus which is proximate to the surface thereof, and at a relatively high temperature — e.g. in the range of about 60° F. (15.6° C.) to about 100° F. (37.8° C.) — is exposed to radiant solar energy to increase significantly the temperature thereof — e.g. to a level in the range of about 135° F. (56.8° C.) to about 210° F. (99° C). The thus-heated water is introduced into a plurality of flash separation zones, each succeeding one of which is maintained at a lower subatmospheric pressure than the preceding flash zone. Substantially non-salinous vapor phases are provided, each of which is passed through a separate turbine, or into different stages of a multiple stage turbine, from the resulting motion of which the power is generated. The resulting salinous liquid phase is passed through the power flash separation zones in series flow.

Vapors exiting from the turbines are condensed via indirect heat-exchange with a second salinous water portion, obtained from a second depth substantially below the surface, and at a comparatively lower temperature — e.g., from about 45° F. (7.2° C.) to about 85° F. (29.4° C.) — to recover liquid potable water. The salinous liquid phase emanating from the last power flash zone at a temperature in the range of about 98° F. (36.7° C.) to about 148° F. (64.4° C.), is used to vaporize, via indirect heat-exchange, a hydrocarbon. The hydrocarbon vapors are passed through another turbine, and additional power is generated from the resulting motion. The exiting hydrocarbons are condensed, via indirect heat-exchange with another portion of the second salinous water, and recirculated to the indirect heat-exchanger. The second salinous water portion, following condensation of the turbine vapors, and the final salinous liquid phase, following vaporization of the hydrocarbon, are returned to the source of the salinous water. The salinous liquid phase, returned to the sea water source, is at a temperature not more than 15° F. greater than the temperature of the second salinous water portion initially obtained from the sea, and preferably not more than about 10° F. greater.

As hereinafter discussed in greater detail, a most important variable constitutes the temperature to which the surface water is increased within the solar radiation heat sink. Also of major importance is the temperature differential between the surface water and colder water selected from some finite depth below the surface. Regardless of the temperature of the salinous water charged to the initial flash separation zone, jucidious operating techniques require the utilization of virtually all the resulting temperature differential with respect to the water obtained at the selected depth below the surface. To illustrate, where surface water is available at about 85° F. (29.4° C.) and colder, deeper water is obtainable at about 65° F. (18.3° C.), or a temperature differential of 20° F. (11.1° C.), and the surface water is increased to a temperature of about 170° F. (76° C.), available energy is lost and/or wasted where salinous water is returned to the source at a temperature substantially greater than that of the colder sea water. Likewise, the radiant energy absorbed in going from 85° F. to 170° F., a differential of 85° F., or a differential of 105° F. with respect to the colder water, should be utilized virtually 100.0%. The process encompassed by the present invention makes such utilization economically possible.

OBJECTS AND EMBODIMENTS

A principal object of the present invention involves the simultaneous generation of power and the recovery of potable water from a source of salinous water. A corollary objective resides in the utilization of a combination of solar energy with the natural temperature gradients existing at varying depths of the oceans and seas.

Another object is to provide a technique which affords economic enhancement over the use of natural gas or fossil fuels for the generation of electrical power. Still another object is directed toward increasing the effective degree to which the radiant solar energy absorbed in a solar radiation heat sink is utilized in conjunction with the available ocean thermal gradient.

These objects, as well as others, are achieved through a process for the simultaneous generation of power and the recovery of potable water from a source of salinous water which comprises the sequential steps of: (a) introducing a first salinous water portion, obtained from a first depth proximate to the surface of said source, into a solar radiation heat sink; (b) exposing said first salinous water portion, within said solar radiation heat sink, to radiant solar energy for a time sufficient to raise the temperature thereof to a level of at least about 135° F.; (c) introducing the thus-heated salinous water into a plurality of vacuum flash separation zones, each succeeding one of which is maintained at a lower subatmospheric pressure than the preceding zone, (i) to produce substantially non-salinous vaporous phases equal in number to the number of flash separation zones and, (ii) wherein the salinous liquid phase is introduced in series through the plurality of zones; (d) passing each of said non-salinous vapor phases through a separate turbine and (i) condensing the exit vapors via indirect heat-exchange with a second salinous water portion, obtained from a second depth substantially below the surface of said source, to recover liquid potable water, and, (ii) generating power from the resulting motion of said turbines; (e) vaporizing a hydrocarbon, via indirect heat-exchange with the salinous liquid phase emanating from the last flash zone in said plurality, and (i) passing the resulting vaporized hydrocarbon through a turbine, (ii) condensing the exit hydrocarbon vapors, via indirect heat-exchange with said second salinous water portion and, (iii) re-vaporizing the resulting condensed hydrocarbon; and, (f) generating additional power from the turbine through which said hydrocarbon vapors are passed.

This embodiment is further characterized in that the first flash zone in the plurality is maintained at a subatmospheric pressure of about 1.5 psia. to about 8.5 psia. The last vacuum flash zone is maintained at a subatmospheric pressure of about 0.9 psia. to about 9.5 psia.

In a more specific embodiment, the present invention affords a process for the simultaneous generation of power and the recovery of potable water from a source of salinous water which comprises the sequential steps of: (a) introducing a first salinous water portion, obtained from a first depth proximate to the surface of said source, into a solar radiation heat sink; (b) exposing said first salinous water portion, within said solar radiation heat sink, to radiant solar energy for a time sufficient to raise the temperature thereof to a level of at least about 160° F.; (c) introducing the thus-heated salinous water into a first vacuum flash separation zone, maintained at a subatmospheric pressure, to provide a first substantially non-salinous vaporous phase and a first salinous liquid phase, and passing said first vaporous phase through a first turbine; (d) introducing said first liquid phase into a second vacuum flash separation zone, maintained at a lower absolute pressure than said first vacuum flash zone, to provide a second substantially non-salinous vaporous phase and a second salinous liquid phase, and passing said second vaporous phase through a second turbine; (e) introducing said second liquid phase into a third vacuum flash separation zone, maintained at a lower absolute pressure than the second vacuum flash zone, to provide a third substantially non-salinous vaporous phase and a third salinous liquid phase, and passing said third vaporous phase through a third turbine; (f) generating power from the resulting motion of said first, second and third turbines, and condensing the turbine exit vapors, via indirect contact with a second salinous water portion, obtained from a second depth substantially below the surface of said source, to recover liquid potable water; (g) vaporizing a hydrocarbon, via indirect heat-exchange with said third liquid phase, and (i) passing the resulting vaporized hydrocarbon through a turbine, (ii) condensing the exit hydrocarbon vapors, via indirect heat-exchange with said second salinous water portion and, (iii) re-vaporizing the resulting condensed hydrocarbon; and, (h) generating additional power from the turbine through which said hydrocarbon vapors are passed.

This specific embodiment is further characterized in that said first vacuum flash zone is maintained at a subatmospheric pressure of from about 2.5 psia. to about 8.5 psia., said second vacuum flash separation zone is maintained at a subatmospheric pressure in the range of about 1.5 psia. to about 5.5 psia., and said third vacuum flash zone is maintained at a subatmospheric pressure of about 0.9 psia. to about 3.5 psia.

These, as well as other objects and embodiments, will become evident to those possessing the requisite skill in the appropriate art, from the following detailed description of the present invention. First, however, a discussion of known applicable prior art is believed to be warranted.

PRIOR ART

It would appear that the greater proportion of available prior art consists of articles published in various trade and scientific journals. Two examples of these will be discussed hereinbelow. With respect to issued patents, these appear to be principally directed toward various devices capable of utilizing radiant solar energy for (1) heating homes and other types of structures, and, (2) the desalination of non-potable water. For example, respecting the latter, U.S. Pat. No. 2,803,591 (Cl. 202-234), issued Aug. 20, 1957, directs itself to a form of solar still for the purification of undrinkable water. This impure water is introduced, via spraying, into a closed and well-insulated chamber containing hot, dry air which becomes enriched with water vapor. The saturated hot air is withdrawn and cooled, yielding a condensate which is recovered as potable water. The device utilizes a series of mirrors to concentrate the rays of the sun for the purpose of heating the air which is introduced into the spray chamber.

In U.S. Pat. No. 2,813,063 (Cl. 202-234), issued Nov. 12, 1957, there is described a solar still having a wick which becomes saturated with salt water. Solar radiation heats the wick and causes the evaporation of water. The still is constructed from a semi-rigid, flexible material such as polyethylene, and is transparent with respect to solar radiation. A similar solar still, absent the wick, is illustrated in U.S. Pat. No. 2,848,389 (Cl. 202-234), issued Aug. 19, 1958.

An article entitled "Efforts to Tap Ocean Thermal Energy Gain", *Chemical and Engineering News*, Feb. 9, 1976, pp. 19-20, in part discusses the use of available ocean thermal gradients. In one particular system, a working fluid such as propane or ammonia is employed in a closed Rankine cycle. Warm surface water passes through a heat exchanger-evaporator, causing vaporization of the working fluid. The vapor is then expanded in a turbine to generate electric power. From the turbine, the vapor passes to a heat exchanger-condenser, wherein it is cooled and condensed by cold deep ocean water, and recycled to the heat exchanger-evaporator. Since the maximum differential temperature between surface water and deep water is not appreciably greater than 40° F., this technique suffers from an extremely low thermodynamic cycle efficiency, and is, therefore, impractical on a commercial scale.

Of further interest is an article entitled "Desalination of Sea Water Using Solar Radiation Under Retarded Evaporation Conditions", *Industrial Engineering Chemistry, Process Design Development,* Volume 14, No. 4, 1975, pp. 351-358. Described is a desalination process which primarily uses the temperature difference between the surface sea water and the deep sea water. A shallow pond, swamp area, or a large heating flat is proposed for use as the radiant solar energy sink. Water, from the surface, is pumped into the pond where it is heated by solar radiation. An insoluble monolayer, or a thin, transparent plastic sheet on the water surface is suggested for suppressing the evaporative heat loss from the water layer. The heated water is fed into a heat exchanger which is vacuum chamber. The warm sea water partly flash evaporates while it runs down a packed section. The vapor condenses in an adjoining section over cooling coils being supplied with cold deep sea water, which cooling water is returned to the sea. Noted is the fact that there is no provision for the simultaneous generation of power from the flashed vapors.

U.S. Pat. No. 3,928,145 (Cl. 203-11), issued Dec. 23, 1975, is specifically referred to in an article entitled "Power, Fresh Water and Food from the Sea," *Mechanical Engineering,* September, 1975, pp. 27-34. All of the subject matter which appears in the article can be found in the issued patent, the latter being more inclusive. Therefore, the discussion which follows will be specifically directed toward the pertinency of the issued patent, from which the present invention can be readily distinguished. As initially described, in general terms, combined use is made of solar radiation and the thermal gradients existing between surface and deep sea water. Warm surface water, from tropic seas, is increased in temperature through the use of a solar heater; the heated sea water is flash evaporated, or boiled at subatmospheric pressure. Sensible heat of the water leaves as vaporous heat, and the steam formed, as the sea water cools, expands to a lower pressure in a turbine, or other steam engine which drives a generator. The exit vapors are passed into a condenser wherein they are condensed via indirect heat-exchange with cold water from the depths of the sea. As an integral part of the process, the heated sea water from the condenser is introduced into a mariculture system which produces at least one specie of food fish; water from the mariculture operation is passed into the solar heater and therefrom into the flash boiler, the discharge water from which is returned to the sea.

Briefly referring to the accompanying drawing, the sole FIGURE presented is illustrative of a particularly preferred embodiment of the present invention. By comparison with the foregoing, it becomes quite clear that there is no prior art recognition of multiple flash separation zones for the generation of power and the simultaneous recovery of potable water. Referring again to U.S. Pat. No. 3,928,145, a so-called multiple flash evaporator is described; it is, however, intended solely for maximizing fresh water recovery without any power generation. As stated in this reference, surface sea water is available at 86° F. (30° C.), and may be increased in temperature to about 95° F. (35° C.) by admixing therewith the warm water effluent from the mariculture pools, or to 175° F. (78.8° C.) by flowing ponds having black bottoms and transparent covers. When utilizing a single flash evaporation zone to generate power and recover potable water, the sea water becomes cooled to a temperature of 77° F. (25° C); at this temperature, the subatmospheric pressure within the flash evaporator is 0.46 psia. (23.8 mm. of Hg). The resulting vaporous phase is passed through a turbine, and the exit vapors condensed to 59° F. (15° C.) using cold sea water which is available at a temperature of 41° F. (5° C.), the latter (following condensation) increases in temperature to 50° F. (10° C.). The resulting flash evaporated liquid phase, at 77° F. (25° C.), is directly returned to the source of the sea water. In so doing, the disclosed process effectively wastes the available 18° F. temperature differential between 59° F. and 77° F., by not contemplating a second flash evaporation of the 77° F. liquid phase down to 59° F. This would be effected at a subatmospheric pressure of about 0.25 psia. (12.9 mm. of Hg.), to recover additional amounts of potable water. In effect, there exists a waste of about 18 BTU/lb. of water.

Further in view of the fact that only one flash evaporation stage is employed for power production, the process will actually generate very little power. As a general proposition, the work developed in the turbine is proportional to the ratio of the pressures across the turbine; that is, the ratio of the pressure of the vapors introduced into the turbine to the pressure of the vapors exiting therefrom. By using a single turbine, the disclosed procedure has an effective pressure ratio closely approximating 0.46/0.25, or 1.84:1.0. As above stated, the reference contemplates multiple flash stages only to increase the recovery of water; it is, therefore, concerned solely with multiple condensation stages. In short, by not employing a final flash to the lowest possible temperature, the disclosed process does not recover all the potable water possible. The quantity of power generated falls short of the maximum available in view of the fact that a plurality of power flash stages is not employed.

SUMMARY OF THE INVENTION

The present invention offers a feasible process which is capable of currently being commercially acceptable. With respect to the technology demand imposed upon an installation of given capacity, there is afforded great flexibility with respect to the relative amount of generated power and the quantity of potable water recovered. That is, a commercially designed system, having a solar radiation heat sink, in the form of a shallow solar pond, receiving solar insolation in the amount of about 3,000 BTU/sq.ft./day, can readily be operated to produce from about 3,000 kw. to about 11,200 kw. of power, or more, depending upon the load demand. The recovery of potable water generally decreases somewhat as the generated power increases; while there appears to be no direct correlation, potable water is recoverable in amounts which range from about 800,000 gal./day to about 1,600,000 (1.6 MM) gal./day. While the particular design of any given system is most certainly affected by existing economic considerations in the locale of the installation, being principally the particular value places upon power and potable water, other factors must generally be considered. Fundamental to the process herein described, is the plurality of power flash separation zones followed by a separate flash zone for additional potable water recovery. With respect to the former, three flash separation zones produce more power than two, but less power than four. By the same token, six power flash zones produce less power than seven, but more power than five. Capital expenditure, however, obviously increases as the number of individual zones in the power flash evaporation system increases.

In the discussion which follows, several operational variables have been arbitrarily selected in order to form a basis for illustration. In addition to the character and size of the solar radiation heat sink, these variables are: (1) surface water at a temperature of 85° F.; (2) colder, deeper water at a temperature of 70° F.; and, (3) heated surface water at a temperature of 200° F. Briefly, as hereinbefore stated, the present process involves the combinative utilization of ocean thermal gradients and solar radiation for the simultaneous generation of power and the recovery of potable water. Where a sufficient thermal gradient, at least about 15° F., is not available, certain modifications can be made to achieve the desired end result of power generation accompanied by potable water recovery. However, where temperature differentials of about 15° F. to about 40° F. exist (the latter generally considered the practical maximum available), the present technique affords enhancement in overall efficiency, especially at the higher temperature gradients.

Initially, surface water is introduced into a solar radiation heat sink, the exact dimensions of which are primarily dependent upon the available insolation. Insolation may be conveniently expressed as the quantity of B.T.U.'s from the sun, falling upon a square foot of heat sink surface per day, or the incidence of solar energy. Solar radiation heat sinks may take the form of flat plate collectors, or in the interest of capital investment, a shallow solar pond. The latter constitutes an economical device for capturing a portion of the insolation falling upon it from the sun, whenever only moderate temperatures of the heated water are required. Surface sea water is pumped into the solar pond to a depth which varies seasonally, much the same as the insolation from the sun varies seasonally. Depending upon the season, as well as the desired temperature of the heated water, a pond depth in the range of about one to about 10 inches is acceptable, although a solar pond depth from 2 to about 8 inches appears to be the most practical. The length and width of the solar pond are generally determined by the terrain and climate which are peculiar to the locale of the unit. The temperature to which the water in the solar pond is heated, prior to being charged to the process, depends upon the relative quantities of potable water and generated power which the selected installation is designed to deliver. For example, a solar pond receiving insolation in the amount of 3,000 BTU/sq.ft./day, and functioning at an efficiency of about 60.0%, would heat a three-inch level of water from about 85° F. (29° C.) up to about 200° F. (93° C.) during a period of approximately 10 daylight hours. Solar pond efficiency is determined by comparing its heat absorption with the total insolation available, and should be such that the sea water attains a temperature level of at least about 135° F. (56.8° C.), and preferably about 160° F. (71° C.).

In order to increase the efficiency of the solar pond, evaporation heat loss therefrom is inhibited through the use of a covering. Suitable coverings are those which are transparent to solar radiation, while simultaneously being opaque to long wave radiation. Additionally, a suitable covering will provide an insulating effect between the water being heated and the atmosphere, such that conductive and convective heat loss is minimized. For example, one such suitable covering would be hollow glass balls, or beads having a nominal diameter of about ¼ inch to about ½ inch, disposed in a layer from about ¼ inches to about 2 inches thick. A relatively thin (4 to about 6 mils) sheet of polyvinyl chloride can be suitably employed, as can two such sheets which are uniformly tacked to provide a multitude of air bubbles having a minimum air gap of about 1 inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fused polyvinyl chloide bubbles, about 1 to 2 inches thick; and, a combination of polyvinyl chloride-coated fiberglass to which the polyvinyl sheet is uniformly tacked.

Also of importance, with respect to the efficiency of the solar pond, is the insulation of the sides and bottom thereof. Several techniques to accomplish this will become evident to those possessing the requisite skill in the appropriate art. For instance, the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styrofoam, vermiculite, etc., can be used as the lining over which the black sheet of polymeric material is placed. Insulating material can be foamed on and thus become integral with the polymeric sheet, or the polymeric material can be impregnated with an inorganic substance having a high absorptivity/emmisivity ratio; this may be copper oxide, nickel oxide, black nickel, etc.

Following the prescribed period of exposure to solar radiation, during which the temperature of the surface sea water in the pond is increased to a level of at least about 135° F. (56.8° C.), and at such time as the water has reached its maximum temperature for the day, the heated salinous water is drained into a hot water storage pond, or sump. The size of the sump depends upon the design capacity of the unit; however, it should be capable of storing at least a 24 hour supply of the heated salinous water. To reduce the loss of energy from the surface of the sump, it is preferred that the depth thereof be significantly greater than its length and width. Furthermore, the storage pond should be covered and lined much the same as the solar pond.

In further describing my invention, it will be assumed that surface sea water is available at a temperature of about 85° F. (29.4° C.) and that the temperature about 450 feet below the surface is approximately 70° F. Also, that insolation from the sun, at the period of the year being considered, is at least 3,000 BTU/sq.ft./day, and that a reasonably efficient (about 50.0%) solar pond is being employed as the solar radiation heat sink. The solar pond will be one which covers about 200 acres and has a depth of about 2½ inches; during approximately ten hours of daylight, this pond would heat 113 MM lbs. (51.37 MM kg.) of surface water, 13.2 MM gal./day, from its initial temperature to about 200° F. (93° C.). The storage pond, or sump will be sized for a capacity of at least this amount in order to accommodate the daily hot water make.

As hereinbefore stated, the basic prior art processing technique involves charging the heated salinous water into a flash separation zone which is maintained under subatmospheric pressure. This provides a non-salinous vaporous phase, which is passed through a turbine, and a salinous liquid phase which is returned to the source of the sea water. In accordance with my invention, the flash separation zone preferably consists of multiple power flashes in a plurality of vacuum flash zones, functioning in series with respect to the salinous liquid phase, each succeeding one of which is maintained at a lower subatmospheric pressure. This increases both the overall efficiency of the process and the quantity of generated power, albeit accompanied by some decrease in the amount of potable water which is recovered. Thus, for instance, where the flash separation zone is a single vessel maintained at about 2.89 psia. (149 mm. of Hg.), the vapors will pass through the turbine at about 140° F. (60° C.) and about 6,000 kw., or about 8,000 HP will be generated from the resulting motion thereof. The vapors, after being cooled via indirect heat-exchange with sea water at about 70° F., result in the recovery of about 800,000 gal./day of potable water. Where the initial power flash is effected at 2.89 psia., with the resulting liquid phase being flashed at 0.51 psia. (26.4 mm. of Hg), in a second zone, power is still generated in an amount of about 8,000 HP (about 6,000 kw.), but the potable water recovery increases to an amount of about 1.55 MM gal/day.

As hereinafter discussed, with specific reference to the accompanying drawing, it is preferred to effect the power flash in a plurality of vacuum flash zones (three such flash zones are illustrated), with the resulting vaporous phases passing through multiple turbine stages functioning in tandem. In this technique, the final power flash is effected at a subatmospheric pressure of about 3.5 psia. (181 mm. of Hg.) to about 0.9 psia. (46.5 mm. of Hg.). The first vacuum flash zone is maintained at a pressure of about 8.5 psia. (440 mm. of Hg.) to about 2.5 psia. (129.3 mm. of Hg.), while the intermediate flash is effected at a subatmospheric pressure in the range of about 5.5 psia. (284 mm. of Hg.) to about 1.5 psia. (77.6 mm. of Hg.). The final salinous liquid phase, from this power flash system, will be at a temperature of about 98° F. (36.7° C.) to about 148° F. (64.4° C.). This liquid phase is employed, via indirect heat-exchange, to vaporize a hydrocarbon which then passes through a separate turbine, the resulting motion of which is employed to generate additional power. The exiting hydrocarbons, in a closed-loop system, are cooled and/or condensed via indirect heat-exchange with 70° F. sea water, and re-introduced into the heat-exchanger/vaporizer. Where surface water is heated to a temperature of 200° F. (93° C.), potable water is recovered in an amount of about 800,000 gal/day, while power is generated in an amount of about 15,000 HP (11,200 kw.).

Preferred classes of hydrocarbons are paraffins and mono-olefins containing from about one to about four, and include, therefore, methane, ethane, ethylene, propane, propylene, butane and butylene (including isomers), as well as mixtures thereof. Especially preferred are propane, propylene, butanes and/or butylenes. Halogenated hydrocarbons, containing fluorine and/or chlorine, most of which are categorized under the generic name "Freon" (a trademark for a line of fluorinated hydrocarbons) may also be employed in the closed-loop vaporization cycle. Exemplary of these halogenated hydrocarbons are trichloromonofluoromethane, dichlorodifluoromethane, monochlorotrifluoromethane, monobromotrifluoromethane, tetrafluoromethane, monochlorodifluoromethane, trichlorotrifluoroethane, dichlorotetrafluoroethane, octafluorocyclobutane, tetrachlorodifluoroethane, etc.

In accordance with the present invention, sea water, at a temperature of about 85° F. (29° C.), is introduced into the solar pond wherein the temperature is increased to a level in the range of about 160° F. (71° C.) to about 200° F. (93° C.). The heated sea water passes into the storage pond, or sump, from which it is charged to the unit at the designed hourly rate. As previously set forth, the initial temperature of the heated sea water will be primarily dependent upon (1) the surface temperature of the sea water, (2) the efficiency of the solar pond and, (3) the resistance of the storage pond to radiation losses. Power will be generated, and potable water recovered as a result of a temperature increase of as little as 50° F.; however, it is readily apparent that the higher the temperature, the more efficient the process and the greater the generation of power and recovery of potable water. Preferably, the present invention involves the use of three individual vacuum flash zones; the first zone, into which the heated sea water, at about 200° F., is initially introduced, will be maintained at a subatmospheric pressure in the range of about 6.5 psia. (336 mm. of Hg.) to about 8.5 psia. (440 mm. of Hg.). The second power flash zone will function at a subatmospheric pressure of about 4.0 psia. (207 mm. of Hg.) to about 5.5 psia. (284 mm. of Hg.), while the third zone is maintained at a level of about 2.5 psia. (129 mm. of Hg.) to about 3.5 psia. (181 mm. of Hg.). The resulting three vaporous phases are passed through separate turbines, functioning in tandem, or into different stages of a multiple-stage turbine, from the resulting motion of which the power is generated.

The foregoing discussion describes a process wherein the power flash is effected in a series of individual vacuum flash zones, with the final power flash being obtained at a subatmospheric pressure of about 2.89 psia. and about 140° F. The last salinous liquid phase is employed as the heat-exchange medium in a closed-loop hydrocarbon vaporization cycle, the vapors being used to drive a separate turbine and thus increase the quantity of generated power. As will be recognized from the foregoing, the process offers heretofore unavailable flexibility respecting the comparative quantities of generated power and potable water recovered from a given capacity unit.

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances, to modify the illustrated process, is well within the purview of one skilled in the appropriate art, and the use thereof will not create a departure from the scope and the spirit of the appended claims.

DESCRIPTION OF DRAWING

With specific reference now to the drawing, the sole FIGURE represents a particularly preferred embodiment wherein a plurality of power flash zones, 9, 14 and 19, are employed to produce three vaporous phases which are passed through turbines 11, 16 and 21. Surface sea water, from a source 1, at a temperature of about 85° F., is introduced via line 2 into solar pond 3. The solar pond, having a covering 4 (as previously described), is sized to accept 3,000 BTU/sq.ft./day of solar energy, and 113 MM lbs. (51.36 MM kg.) per 24 hour day, of salinous water. The heated water 5, at a temperature of about 200° F., is introduced into sump 7, from which it is passed into flash separation zone 9 by way of line 8. The rate of salinous water entering zone 9 is about 4.7 MM lbs/hr. (2.14 MM kg.) and the zone functions at a subatmospheric pressure of about 7.51 psia. (388 mm. of Hg.). The resulting non-salinous vaporous phase passes via line 10 into and through turbine 11, while the salinous liquid phase, at a temperature of about 180° F. (83° C.), passes through line 13 into vacuum flash zone 14, maintained under a subatmospheric pressure of about 4.74 psia. (245 mm. of Hg.). Additional non-salinous vapors pass via line 15 into turbine 16, and a second salinous liquid phase, at a temperature of about 160° F. (71° C.), is introduced, via line 18, into flash zone 19, which is maintained at a subatmospheric pressure of about 2.89 psia. (149 mm. of Hg.). The vaporous phase in line 20 is passed thereby through turbine 21.

The turbines 11, 16 and 21 function in tandem, and the resulting motion generates power via generator 39 and line 40. Turbine exit vapors in lines 17 and 22 are admixed with those in line 12, the mixture continuing therethrough into condenser 23. Cold sea water, from line 35, at a temperature of about 70° F. is used as the heat-exchange medium, the warm water being returned to source 1, via line 36, while potable water is recovered via line 24. The salinous liquid phase from flash zone 19, at a temperature of about 140° F. (60° C.), is introduced into hydrocarbon vaporizer 26 through conduit 25. Cooled and/or condensed propane, from line 28, is vaporized, and the vapors pass via line 29 into and through turbine 30, the motion of which generates additional power, from generator 37, in conduit 38. Hydrocarbon vapors exiting turbine 30 are introduced into condenser 32, by way of conduit 31. Sea water, at a temperature approximating 70° F. (21° C.), is diverted through line 33, from conduit 35, as the heat-exchange medium; warmed sea water in line 34 is returned to sea water source 1 by way of being admixed with that in main return conduit 36.

The foregoing specification, particularly when read in light of the accompanying drawing, is believed to present a concise definition and a clear understanding of the present invention for the simultaneous generation of power and the recovery of potable water from salinous sea water.

I claim as my invention:

1. A process for the simultaneous generation of power and the recovery of potable water from a source of salinous water which comprises the sequential steps of:
   a. introducing a first salinous water portion, obtained from a first depth proximate to the surface of said source, into a solar radiation heat sink;
   b. exposing said first salinous water portion, within said solar radiation heat sink, to radiant solar energy for a time sufficient to raise the temperature thereof to a level of at least about 135° F.;
   c. introducing the thus-heated salinous water into a plurality of vacuum flash separation zones, each succeeding one of which is maintained at a lower subatmospheric pressure than the preceding zone, (i) to provide substantially non-salinous vaporous phases equal in number to the number of flash separation zones, and (ii) wherein the salinous liquid phase is introduced in series through the plurality of zones;
   d. passing each of said non-salinous vapor phases through a separate turbine and (i) condensing the exit vapors via indirect heat-exchange with a second salinous water portion, obtained from a second depth substantially below the surface of said source, to recover liquid potable water, and, (ii) generating power from the resulting motion of said turbines;
   e. vaporizing a hydrocarbon, via indirect heat-exchange with the salinous liquid phase emanating from the last flash zone in said plurality, and (i) passing the resulting vaporized hydrocarbon through a turbine, (ii) condensing the exit hydrocarbon vapors, via indirect heat-exchange with said second salinous water portion and, (iii) re-vaporizing the resulting condensed hydrocarbon; and,
   f. generating additional power from the turbine through which said hydrocarbon vapors are passed.

2. The process of claim 1 further characterized in that said second salinous water portion, following condensation of said turbine exit vapors, and said salinous liquid phase, following vaporization of said hydrocarbon, are returned to the source of said salinous water.

3. The process of claim 1 further characterized in that said hydrocarbon contains from one to about four carbon atoms per molecule.

4. The process of claim 1 further characterized in that said hydrocarbon is halogenated.

5. The process of claim 1 further characterized in that said solar radiation heat sink is a flat plate collector.

6. The process of claim 1 further characterized in that said solar radiation heat sink is a shallow solar pond.

7. The process of claim 1 further characterized in that the first flash zone in said plurality is maintained at a subatmospheric pressure of about 1.5 psia. to about 8.5 psia.

8. The process of claim 1 further characterized in that the last flash zone in said plurality is maintained at a subatmospheric pressure in the range of about 0.9 psia. to about 5.5 psia.

9. A process for the simultaneous generation of power and the recovery of potable water from a source of salinous water which comprises the sequential steps of:
   a. introducing a first salinous water portion, obtained from a first depth proximate to the surface of said source, into a solar radiation heat sink;
   b. exposing said first salinous water portion, within said solar radiation heat sink, to radiant solar energy for a time sufficient to raise the temperature thereof to a level of at least about 160° F.;
   c. introducing the thus-heated salinous water into a first vacuum flash separation zone, maintained at a subatmospheric pressure, to provide a first substantially non-salinous vaporous phase and a first salinous liquid phase, and passing said first vaporous phase through a first turbine;
   d. introducing said first liquid phase into a second vacuum flash separation zone, maintained at a lower absolute pressure than said first vacuum flash zone, to provide a second substantially non-salinous vaporous phase and a second salinous liquid phase, and passing said second vaporous phase through a second turbine;
   e. introducing said second liquid phase into a third vacuum flash separation zone, maintained at a lower absolute pressure than the second vacuum flash zone, to provide a third substantially non-salinous vaporous phase and a third salinous liquid phase, and passing said third vaporous phase through a third turbine;

f. generating power from the resulting motion of said first, second and third turbines, and condensing the turbine exit vapors, via indirect contact with a second salinous water portion, obtained from a second depth substantially below the surface of said source, to recover liquid potable water;

g. vaporizing a hydrocarbon, via indirect heat-exchange with said third liquid phase, and (i) passing the resulting vaporized hydrocarbon through a turbine, (ii) condensing the exit hydrocarbon vapors, via indirect heat-exchange with said second salinous water portion and, (iii) re-vaporizing the resulting condensed hydrocarbon; and, h. generating additional power from the turbine through which said hydrocarbon vapors are passed.

10. The process of claim 9 further characterized in that said first vacuum flash zone is maintained at a subatmospheric pressure of from about 2.5 psia. to about 8.5 psia., said second vacuum flash separation zone is maintained at a subatmospheric pressure in the range of about 1.5 psia. to about 5.5 psia., and said third vacuum flash zone is maintained at a subatmospheric pressure of about 0.9 psia. to about 3.5 psia.

* * * * *